United States Patent [19]

Collette et al.

[11] Patent Number: 5,713,399
[45] Date of Patent: Feb. 3, 1998

[54] ULTRASONIC SEAMING OF ABUTTING STRIPS FOR PAPER MACHINE CLOTHING

[75] Inventors: A. Leon Collette, Auburn; James G. Donovan, Norwell; Henry M. Cooke, Randolph, all of Mass.; Bodil Jonasson, Halmstad, Sweden

[73] Assignee: Albany International Corp., Albany, N.Y.

[21] Appl. No.: 797,560

[22] Filed: Feb. 7, 1997

[51] Int. Cl.⁶ .................................................. D03D 13/00
[52] U.S. Cl. ........................... 139/383 AA; 162/904; 156/73.4; 156/148; 156/195; 428/193; 442/185; 28/110
[58] Field of Search ........................ 162/904; 156/73.4, 156/148, 195; 428/193; 442/185, 186; 139/383 AA; 28/110; 264/258, 496

[56] References Cited

U.S. PATENT DOCUMENTS

| | | |
|---|---|---|
| 4,761,329 | 8/1988 | Halker et al. ............... 139/383 AA |
| 5,169,570 | 12/1992 | Sayers et al. ............... 139/383 AA |
| 5,360,656 | 11/1994 | Rexfelt et al. .............. 139/383 AA |
| 5,480,604 | 1/1996 | Johnson et al. ............. 162/904 |

*Primary Examiner*—Andy Falik
*Attorney, Agent, or Firm*—Kane, Dalsimer, Sullivan, Kurucz, Levy, Eisele and Richard, LLP

[57] ABSTRACT

A method for manufacturing a papermaker's fabric by spirally winding a woven fabric strip, narrower than the intended width of the fabric, and the papermaker's fabric manufactured in accordance with the method, are disclosed. The fabric strip includes lengthwise and crosswise yarns, and has a lateral fringe along at least one lateral edge thereof, the lateral fringe being unbound ends of the crosswise yarns extending beyond the lateral edge. During the spiral winding of the fringed strip, the lateral fringe of a turn overlies or underlies an adjacent turn of the strip. The lateral edges of adjacent turns abut against one another. The spirally continuous seam so obtained is closed by ultrasonically welding or bonding the overlying or underlying lateral fringe to the fabric strip in an adjacent turn.

24 Claims, 5 Drawing Sheets

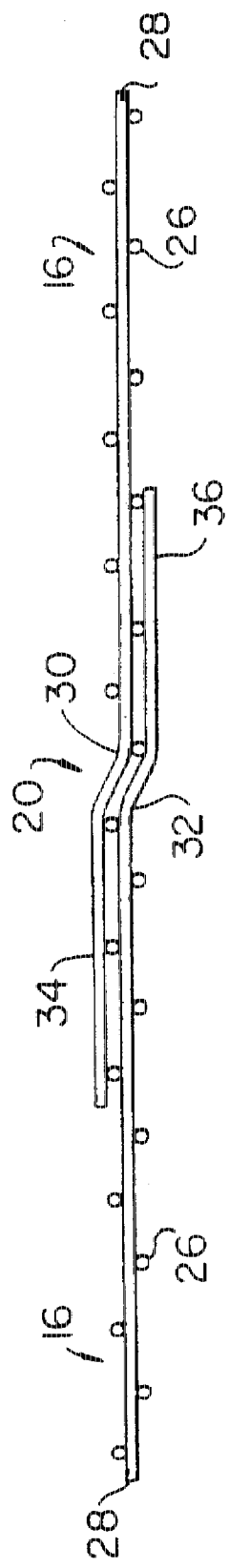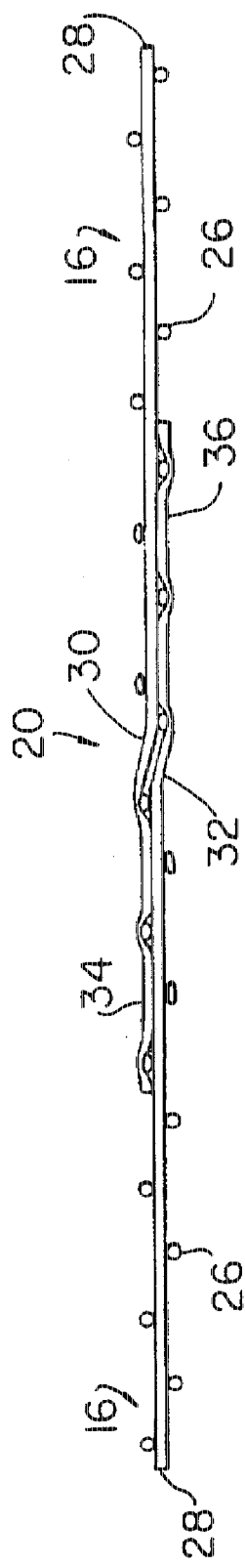

ULTRASONIC SEAMING OF ABUTTING STRIPS FOR PAPER MACHINE CLOTHING

BACKGROUND OF THE INVENTION

1. Field of the Invention

The present invention relates to the seaming of fabrics into endless loops for use as paper machine clothing or as a component in paper machine clothing, such as forming, press and dryer fabrics, or as a base for a polymer-coated paper industry process belt, such as a long nip press belt. More specifically, the invention concerns the use of ultrasonic energy to produce a spirally continuous seam in the production of wide paper machine clothing from a relatively narrow, spirally wound woven fabric strip.

2. Description of the Prior Art

Until quite recently, the fabrics used as paper machine clothing have been either woven endless using a tubular weaving technique, or have been flat-woven and subsequently joined into endless form with a seam. In either case, because paper machine clothing have widths, measured transversely across their endless-loop forms, of from about 60 to 450 inches (1.5 to 11.4 meters), and lengths, measured longitudinally around their endless-loop forms, of about 10 or more feet (3.1 or more meters), looms of varied sizes, including expensive, large weaving looms, are required for their production. Whether a fabric is woven endless or is flat-woven and seamed into endless form, the weaving process is a time-consuming and cumbersome operation.

In a recent advance, described in U.S. Pat. No. 5,360,656 to Rexfelt et al., a press fabric comprises a base fabric which is made of a fabric of yarn material and is endless in the longitudinal (machine) direction thereof. One or more layers of fiber material are arranged on the base fabric, and needled thereinto. The base fabric of the press fabric comprises at least one layer composed of a spirally wound strip of fabric of yarn material having a width which is smaller than the width of the base fabric. Lengthwise threads of the spirally wound fabric strip of yarn material make an angle with the longitudinal (machine) direction of the press fabric. The fabric strip of yarn material may be flat-woven on a loom which is narrower than those typically used in the production of paper machine clothing.

The base fabric comprises a plurality of spirally wound and joined turns of the relatively narrow woven fabric strip. The fabric strip is woven from lengthwise (warp) and crosswise (filling) yarns. Adjacent turns of the spirally wound fabric strip may be abutted against one another, and the spirally continuous seam so produced may be closed by sewing, stitching, melting or welding. Alternatively, adjacent longitudinal edge portions of adjoining spiral turns may be arranged overlappingly, so long as the edges have a reduced thickness so as not to give rise to an increased thickness in the area of the overlap. Further, the spacing between lengthwise yarns may be increased at the edges of the strip, so that, when adjoining spiral turns are arranged overlappingly, there may be an unchanged spacing between lengthwise threads in the area of the overlap. In any case, a woven base fabric, having an inner surface, an outer surface, a longitudinal (machine) direction and a transverse (cross-machine) direction, is the result. The lateral edges of the woven base fabric are then trimmed to render them parallel to its longitudinal (machine) direction. The angle between the machine direction of the woven base fabric and the spirally continuous seam may be relatively small, that is, typically less than 10°.

In the method shown in U.S. Pat. No. 5,360,656, the fabric strip is wound around two parallel rolls to assemble the woven base fabric. It will be recognized that endless fabrics in a variety of widths and lengths may be provided by spirally winding a relatively narrow piece of woven fabric strip around the two parallel rolls, the length of a particular endless base fabric being determined by the length of each spiral turn of the woven fabric strip, and the width being determined by the number of spiral turns of the woven fabric strip. The prior necessity of weaving complete base fabrics of specified lengths and widths to order may thereby be avoided. Instead, a loom as narrow as 20 inches (0.5 meters) could be used to produce a woven fabric strip, but, for reasons of practicality, a conventional textile loom having a width of from 40 to 60 inches (1.0 to 1.5 meters) may be preferred.

The manufacturing techniques shown in U.S. Pat. No. 5,360,656 have several inherent performance and cost advantages. The present invention, wherein ultrasonic energy is used to join adjacent turns of the woven fabric strip to one another, is submitted to be an improvement on earlier techniques.

SUMMARY OF THE INVENTION

Accordingly, the present invention comprises both a method of manufacturing a papermaker's fabric, and the fabric made in accordance with the method, wherein adjacent turns of the woven fabric strip are joined to one another by ultrasonic energy.

The practice of the method comprises the first step of manufacturing a woven fabric strip from lengthwise and crosswise yarns. The woven fabric strip may be heat-set following weaving and stored on a stock roll for subsequent use. In any event, the woven fabric strip has a first lateral edge, a second lateral edge and a preselected width measured therebetween, the latter of which is typically much smaller than the width of the papermaker's fabric to be manufactured therefrom.

Along at least one of the first and second lateral edges of the woven fabric strip and extending therebeyond is a lateral fringe. The lateral fringe is made up of the ends of the crosswise yarns extending from the woven fabric strip body.

The fabric strip may be woven so as to be provided with a lateral fringe along at least one of the first and second lateral edges thereof.

The fabric strip also has an upper side and a lower side, and may, as indicated above, be as narrow as 20 inches (0.5 meters) in width, but more practically may be from 40 to 60 inches (1.0 to 1.5 meters) in width, which, in any event, is much narrower than the width, measured transversely (in the cross-machine direction), of a typical papermaker's fabric.

The fabric strip is then spirally wound, perhaps about two parallel rolls, as noted above, in a plurality of turns. The winding is carried out such that the lateral fringe of each turn overlies the upper side of the fabric strip in an immediately adjacent turn, or underlies the lower side of the fabric strip in an immediately adjacent turn. It follows, where the fabric strip has a lateral fringe along both of its lateral edges, that one lateral edge of the fabric strip in each turn overlies a lateral fringe in an immediately adjacent turn, and the other lateral edge of the fabric strip in each turn underlies a lateral fringe in an immediately adjacent turn. In addition, the first lateral edge of each turn of the fabric strip body abuts against the second lateral edge of an immediately adjacent turn thereof. A spirally continuous seam separating adjacent turns of the fabric strip is thereby formed. Along the seam, in effect, one has a combination of a butt joint between the turns of the fabric strip body, and a lap joint formed by the overlying of the lateral fringe, or by the over- and underlying of lateral fringes, with respect to the fabric strip body.

An ultrasonic welding apparatus, and an anvil, are then provided to close the spirally continuous seam. A lengthwise portion of the seam is compressed between the horn of the ultrasonic welding apparatus and the anvil, and the horn is activated to deliver ultrasonic energy thereto to effect the weld. Each lengthwise portion of the spirally continuous seam is so treated to complete the operation.

Preferably, the anvil is a rotatable cylindrical or wheel-like member having a circumferential surface against which the horn compresses the seam for closure. In such a situation, the seam may be continuously run in the lengthwise direction between the horn and rotatable anvil to close the seam in a continuous process. In this process, the lateral fringe along each turn of the spirally wound fabric strip is bonded ultrasonically to the upper or lower side of the woven portion of an immediately adjacent turn thereof. Where a lateral fringe is provided along both lateral edges of the fabric strip, one lateral fringe in each turn of the spirally wound fabric strip is bonded ultrasonically to the upper side of the woven portion of an immediately adjacent turn thereof, and the other lateral fringe is bonded ultrasonically to the lower side of the woven portion of an immediately adjacent turn thereof. When the spirally continuous seam is completely so closed, the result is an endless papermaker's fabric having a machine direction around the endless-loop form thereof, a cross-machine direction across the endless-loop form thereof, an inner surface and an outer surface. The lengthwise yarns of the woven fabric strip make an angle with the machine direction of the endless papermaker's fabric. This angle, a measure of the pitch of the spiral winding, is typically less than 10°.

Because the endless papermaker's fabric is assembled by spiral winding, it is necessary to trim its lateral edges to make them parallel to the machine direction of the endless papermaker's fabric.

The papermaker's fabric manufactured in accordance with the present method may find use as a forming or dryer fabric, as a component in a forming, press or dryer fabric, or as a base for a polymer-coated paper industry process belt, such as a long nip press belt. The forming, press or dryer fabric, or the base for a polymer-coated paper industry process belt, may include two or more layers comprised of the papermaker's fabric manufactured in accordance with the present method. Where this is the case, adjacent layers may be spirally wound in opposite directions. Particularly when used as a component of a press fabric, it may be needled with a non-woven batt of staple fiber material on at least one of its inner and outer surfaces.

The present invention will now be described in more complete detail with frequent reference being made to the figures which may be identified as follows.

BRIEF DESCRIPTION OF THE DRAWINGS

FIG. 4 is a cross-sectional view taken as indicated by line 4—4 in FIG. 1, and shows the seam before closure.

FIG. 6 is a cross-sectional view taken as indicated by line 6—6 in FIG. 1, and shows the seam following closure.

DETAILED DESCRIPTION OF THE PREFERRED EMBODIMENT

Figure 1:
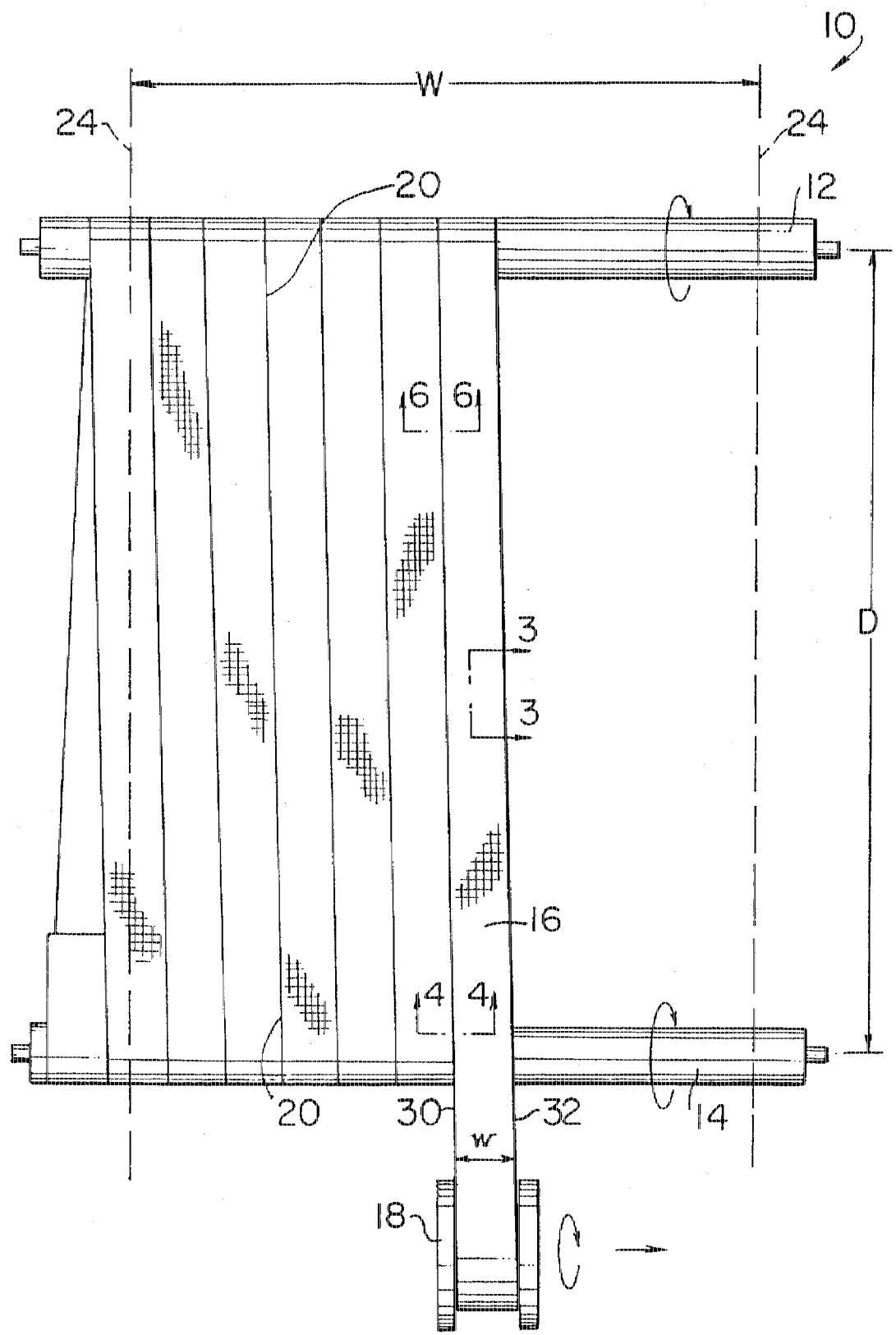
FIG. 1 is a schematic top plan view illustrating a method for manufacturing a papermaker's fabric.

Referring now to the several figures, FIG. 1 is a schematic top plan view illustrating a method for manufacturing a papermaker's fabric. The method may be practiced using an apparatus 10 comprising a first roll 12 and a second roll 14, which are parallel to one another and which may be rotated in the directions indicated by the arrows. A woven fabric strip 16 is wound from a stock roll 18 around the first roll 12 and the second roll 14 in a continuous spiral. It will be recognized that it may be necessary to translate the stock roll 18 at a suitable rate along second roll 14 (to the right in FIG. 1) as the fabric strip 16 is being wound around the rolls 12, 14.

Figure 2:
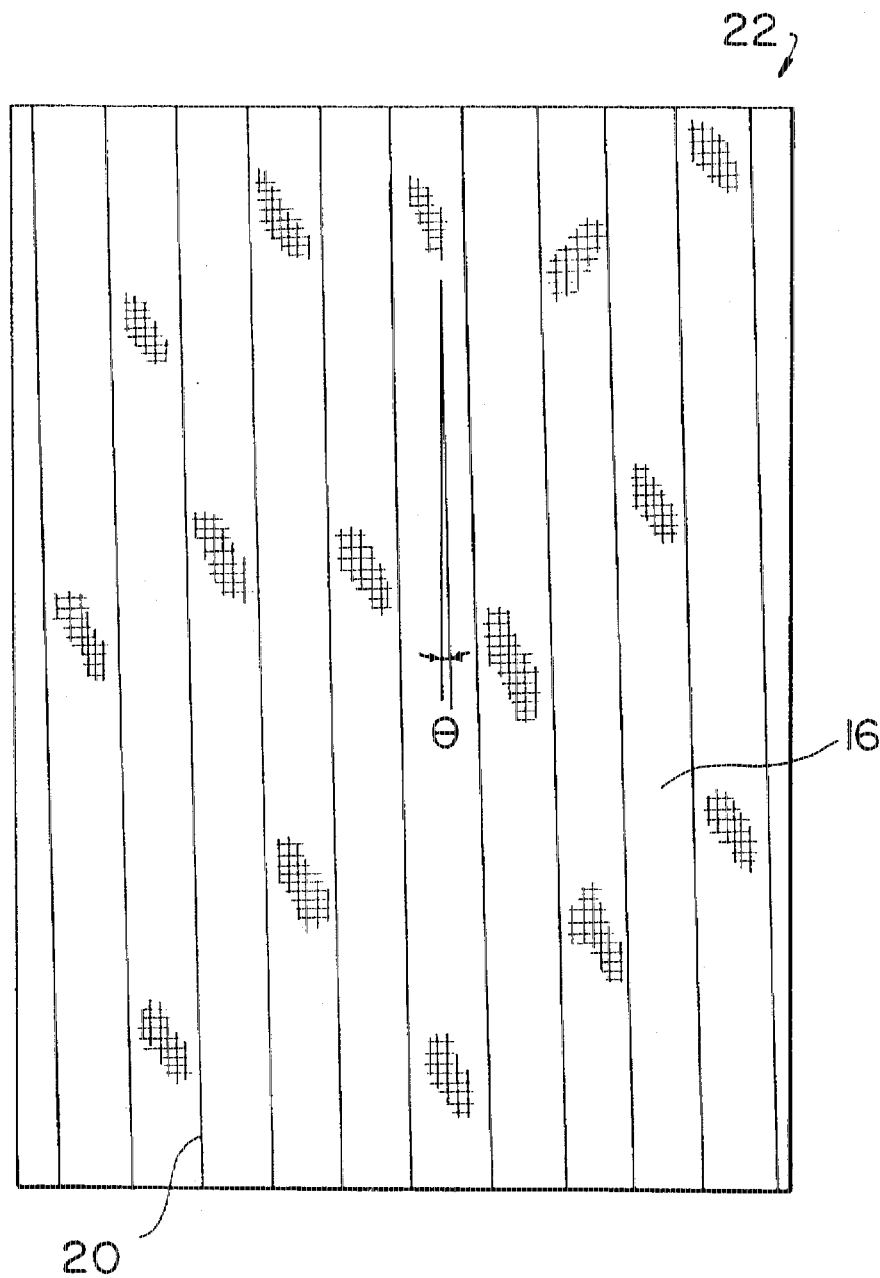
FIG. 2 is a top plan view of the finished papermaker's fabric.

The first roll 12 and the second roll 14 are separated by a distance D, which is determined with reference to the total length, C, required for the papermaker's fabric being manufactured, the total length, C, being measured longitudinally (in the machine direction) about the endless-loop form of the papermaker's fabric. Woven fabric strip 16, having a width w, is spirally wound onto the first and second rolls 12,14 in a plurality of turns from stock roll 18, which may be translated along the second roll 14 in the course of the winding. Successive turns of the fabric strip 16 are disposed relative to one another in the manner to be illustrated below, and are bonded to one another along spirally continuous seam 20 to produce a papermaker's fabric 22 as shown in FIG. 2. When a sufficient number of turns of the fabric strip 16 have been made to produce a papermaker's fabric 22 of desired width W, that width being measured transversely (in the cross-machine direction) across the endless-loop form of the papermaker's fabric 22, the spiral winding is concluded. The papermaker's fabric 22 so obtained has an inner surface, an outer surface, a machine direction and a cross-machine direction. Initially, the lateral edges of the papermaker's fabric 22, it will be apparent, will not be parallel to the machine direction thereof, and must be trimmed along lines 24 to provide the papermaker's fabric 22 with the desired width W, and with two lateral edges parallel to the machine direction of its endless-loop form.

Fabric strip 16 may be woven from monofilament, plied monofilament or multifilament yarns of a synthetic polymeric resin, such as polyester or polyamide, in the same manner as other fabrics used in the papermaking industry are woven. After weaving, it may be heat-set in a conventional manner prior to interim storage on stock roll 18. Fabric strip 16 includes lengthwise yarns and crosswise yarns, wherein, for example, the lengthwise yarns may be plied monofilament yarns while the crosswise yarns may be monofilament yarns. Further, fabric strip 16 may be of a single- or multi-layer weave.

Alternatively, fabric strip 16 may be woven and heat-set in a conventional manner, and fed directly to apparatus 10 from a heat-set unit without interim storage on a stock roll 18. It may also be possible to eliminate heat-setting with the proper material selection and product construction (weave, yarn sizes and counts). In such a situation, fabric strip 16 would be fed to the apparatus 10 from a weaving loom without interim storage on a stock roll 18.

Figure 3:
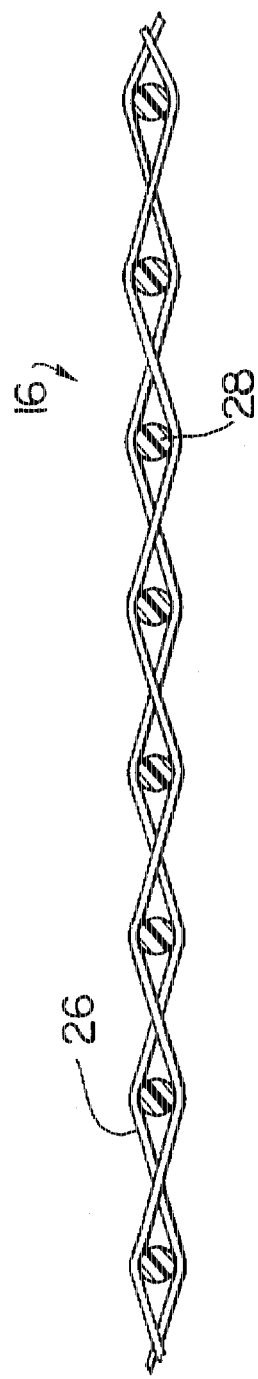
FIG. 3 is a cross-sectional view taken as indicated by line 3—3 in FIG. 1.

FIG. 3 is a cross section of fabric strip 16 taken as indicated by line 3—3 in FIG. 1. It comprises lengthwise yarns 26 and crosswise yarns 28, both of which are represented as monofilaments, interwoven in a single-layer weave. More specifically, a plain weave is shown, although, it should be understood, the fabric strip 16 may be woven according to any of the weave patterns commonly used to weave paper machine clothing. Because the fabric strip 16 is spirally wound to assemble papermaker's fabric 22, lengthwise yarns 26 and crosswise yarns 28 do not align with the machine and cross-machine directions, respectively, of the papermaker's fabric 22. Rather, the lengthwise yarns 26 make a slight angle, θ, whose magnitude is a measure of the pitch of the spiral windings of the fabric strip 16, with respect to the machine direction of the papermaker's fabric 22, as suggested by the top plan view thereof shown in FIG. 2. This angle, as previously noted, is typically less than 10°.

Woven fabric strip 16 has a first lateral edge 30 and a second lateral edge 32. Along the first and second lateral edges 30,32 of the fabric strip 16 are a first lateral fringe 34 and a second lateral fringe 36, respectively. The first and second lateral fringes 34,36 are the ends of crosswise yarns 28 which are not bound by lengthwise yarns 26 and extend beyond the first and second lateral edges 30,32. Alternatively, only one of the first and second lateral edges 30,32 may have a lateral fringe. The lateral fringe or fringes 34,36 may be provided by removing one or more lengthwise yarns 26 from the lateral edge or edges 30,32. Alternatively, the fabric strip 16 may be woven in a manner which provides it with first and/or second lateral fringes 34,36 without requiring the removal of lengthwise yarns 26 from the first and/or second lateral edges 30,32 thereof. In any event, the first and second lateral edges 30,32 define the width of the body of the woven fabric strip 16.

FIG. 4 is a cross-sectional view taken as indicated by line 4—4 in FIG. 1 and is provided to illustrate the manner in which fabric strip 16 is wound onto first and second parallel rolls 12,14 to form spirally continuous seam 20. Once the first of the plurality of spirally wound turns of fabric strip 16 is completed, successive turns are disposed such that the first lateral edges 30 of the body thereof abut against the second lateral edges 32 of previously wound turns of the body of fabric strip 16. As a consequence, the second lateral fringe 36 of each turn is disposed beneath the first lateral edge 30 of the immediately following turn. It follows also, as shown in FIG. 4, that the first lateral fringe 34 of each turn after the first is disposed on top of the second lateral edge 32 of the immediately preceding turn.

Figure 5:
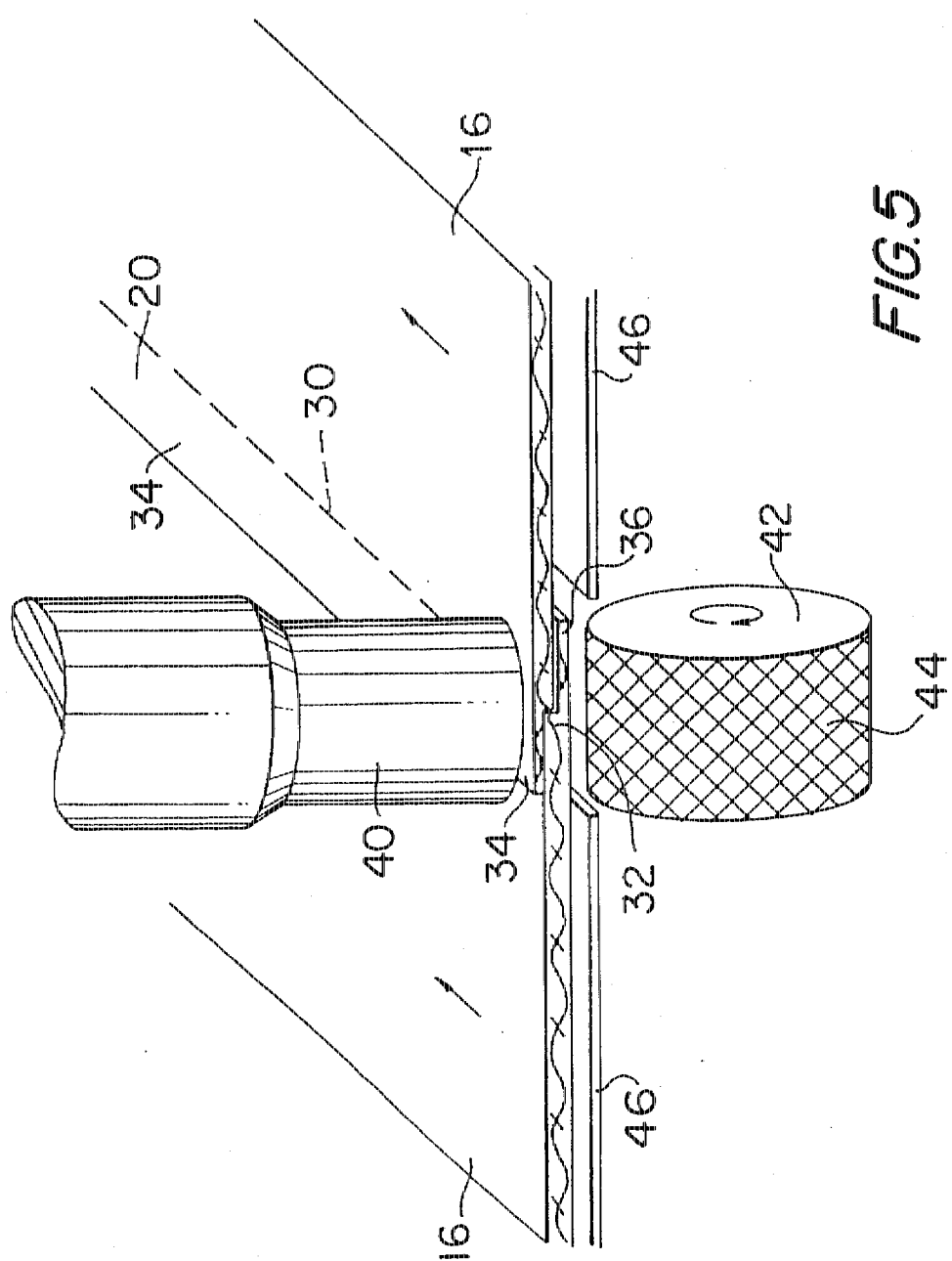
FIG. 5 is a partially cross-sectional view showing schematically the manner in which the spirally continuous seam shown in FIG. 4 is closed in accordance with the present invention.

In accordance with the present invention, the so-disposed first and second lateral fringes 34,36 are ultrasonically bonded to the second and first lateral edges 32,30, respectively, of the woven fabric strip 16 which they over- or underlie. Referring to FIG. 5, the spirally continuous seam 20 illustrated in FIG. 4 is shown schematically between the horn 40 of an ultrasonic welding apparatus and an anvil 42.

The anvil 42 is preferably a rotatable cylinder or wheel-like member whose outer, circumferential surface 44 functions as the surface against which the horn 40 presses the spirally continuous seam 20 for ultrasonic welding. To effect the welding or bonding, the ultrasonic welding apparatus is activated so that horn 40, while compressing the spirally continuous seam 20 against the surface 44 of the anvil, vibrates at an ultrasonic frequency to bond the first and/or second lateral fringes 34,36 to the second and/or first lateral edges 32,30, respectively, of the fabric strip 16.

The outer, circumferential surface 44 of the anvil 42 is preferably knurled in a relatively deep pattern, so that spot welds, rather than a continuous weld, are produced. The knurling may be in a medium, female diamond-knurl pattern. This provides the spirally continuous seam 20 with an openness and porosity comparable to those of other regions of the fabric.

A rotatable anvil, such as anvil 42, facilitates the continuous welding or bonding of the spirally continuous seam 20 by permitting the seam 20 to be continuously drawn between the horn 40 and the rotatable anvil 42 in the manner suggested by the arrows in FIG. 5. In such a situation, the horn 40 and anvil 42 may remain fixed, while the spirally continuous seam 20 is drawn between them for joining. It may be more practical, however, to maintain the horn 40 and anvil 42 fixed relative to one another, and to translate them laterally together in a direction parallel to the first and second parallel rolls, in the same manner as stock roll 18 is translated, while the spirally continuous seam 20 passes between the horn 40 and anvil 42 to close the seam 20. It may be even more practical to maintain the horn 40 and anvil 42 fixed relative to one another as well as stationary, and to translate the papermaker's fabric 22 laterally as the spirally continuous seam 20 is being closed. In this case, stock roll 18 may remain in a fixed position relative to the horn 40 and anvil 42. In any event, plates 46 are provided to support fabric strip 16 on both sides of the spirally continuous seam 20.

FIG. 6 is a cross-sectional view taken as indicated by line 6—6 in FIG. 1, and shows the seam following closure by ultrasonic welding. First lateral fringe 34 is bonded to the top of second lateral edge 32, while second lateral fringe 36 is bonded to the underside of first lateral edge 30, thereby closing the spirally continuous seam 20.

The following Example is submitted to illustrate the present invention:

EXAMPLE

A Branson Model FS-90 ultrasonic welding station was used to form seams of the above-disclosed type. The fabric strip used was a 9 oz/yd$^2$ (300 g/m$^2$) nylon fabric, woven from monofilament weft yarns and plied monofilament warp yarns in a single-layer plain weave pattern, of the type commonly employed as a press fabric base. The ultrasonically welded, spirally continuous seam was prepared as follows:

1. Warp yarns were raveled (removed) from the salvedges of the fabric strip to be joined so that a 5/32-inch (4 mm) fringe of filling yarn was exposed. This fringe, in a production application, could be woven into the selvedge as desired;

2. The two edges of fabric strap to be joined were engaged so that the fringe of a first fabric strip overlapped the top side of a second fabric strip, and the fringe of the second fabric strip was under the bottom side of the first fabric strip. The fully woven, non-fringed portions of the edges of the opposing fabric strips bunted together closely in a common plane. In effect, the fringed portions of the edges formed a lap joint and the fully woven portions formed a butt joint;

3. A 2.5-inch (64 mm) diameter, 0.25-inch (6.4 mm) wide, rotating wheel was used as the anvil for the ultrasonic welding station. The 0.25-inch wide surface of the wheel had been knurled to obtain a medium, female, diamond-knurl pattern. With the fabric strip edges held in the engagement specified above, they were passed between the rotating anvil and a flat-faced, ultrasonically vibrating horn at a feed rate of 10 ft/min (3 m/min), although faster feed rates may be used. This ultrasonic welding step yielded a seam well-suited for its intended purpose.

Tensile tests made across the seam yielded an average seam strength of 34.0 lb/in (5.95 kN/m). By comparison, the filling-direction strength of the fabric strip was measured to be approximately 171 lb/in (30 kN/m), making the average seam strength about 20% of the filling-direction strength. This was found to be more than adequate for the subject application.

Measurements were made of the difference in thickness between the seam and the remainder of the fabric strip, which itself was approximately 0.032 inch (0.81 mm) thick. Seam thicknesses of from 0.001 to 0.002 inch (0.025 to 0.050 mm) greater or less than the thickness of the fabric strip itself were typically found. In one extreme instance, the seam was 0.007 inch (0.18 mm) thicker than the fabric strip.

Visual inspection of the seam indicated that a large amount of the openness of the fabric was retained in the seam.

Modifications to the above would be obvious to those of ordinary skill in the art, but would not bring the invention so modified beyond the scope of the appended claims.

For example, as discussed above, the invention may be practiced by providing only one of the two lateral edges of the woven fabric strip 16 with a lateral fringe, either by removing one or more lengthwise yarns 26 from only one of the two lateral edges or by weaving the fabric strip 16 in a manner which provides it with a lateral fringe along one of its two lateral edges. A woven fabric strip 16 having a lateral fringe only along one of its two lateral edges is spirally wound so that the lateral fringe overlies or underlies the lateral edge of an adjacent turn of the fabric strip. In other words, the invention is practiced as described above, except that the second lateral fringe 36 is omitted. The spirally continuous seam 20 may then be characterized as the combination of a butt joint between the first and second lateral edges 30,32 of fabric strip 16 and a lap joint formed by the overlying or underlying of a lateral fringe on one turn of the fabric strip 16 over or under the adjacent turn of the fabric strip 16.

It should finally be understood that while, in the method illustrated above, the lateral fringe 34 of subsequent turns of the fabric strip 16 overlies the second lateral edge 32 of those previously wound, those of ordinary skill in the art might take a different approach without departing from the scope of the invention as defined by the appended claims. For example, a subsequently wound turn of fabric strip 16 may be brought up under the second lateral edge of the previously wound turn with the result that lateral fringe 24 underlies the second lateral edge 32 of the previous turn. If the fabric strip 16, in this scenario, includes both a first and a second lateral fringe 34,36, a second lateral fringe 36 will be disposed, as a consequence, over the first lateral edge 30 of the next turn.

What is claimed is:

1. A method for manufacturing a papermaker's fabric comprising the steps of:
   a) manufacturing a woven fabric strip from lengthwise and crosswise yarns, said woven fabric strip having a first lateral edge, a second lateral edge and a preselected width measured thereacross between said first and second lateral edges defining a woven fabric strip body, said woven fabric strip further having a first lateral fringe along and extending beyond said first lateral edge, said first lateral fringe being ends of said crosswise yarns;
   b) spirally winding said fabric strip in a plurality of turns wherein said first lateral edge in a turn of said woven fabric strip body abuts against said second lateral edge of an adjacent turn of said woven fabric strip body, whereby said first lateral fringe in a turn of said woven fabric strip overlies or underlies said woven fabric strip in an adjacent turn thereof, thereby forming a spirally continuous seam separating adjacent turns of said woven fabric strip;
   c) providing an ultrasonic welding apparatus having a horn for delivering ultrasonic energy to said spirally continuous seam;
   d) providing an anvil against which said horn may compress a portion of said spirally continuous seam;
   e) compressing said portion of said spirally continuous seam between said horn and said anvil;
   f) activating said horn to deliver ultrasonic energy to said portion of said spirally continuous seam; and
   g) moving said spirally continuous seam longitudinally relative to said horn and said anvil to close said spirally continuous seam by bonding said first lateral fringe to said woven fabric strip in an adjacent turn thereof.

2. The method as claimed in claim 1 wherein said step of manufacturing a woven fabric strip comprises the step of removing at least one lengthwise yarn from an edge thereof to provide said first lateral fringe along said first lateral edge.

3. The method as claimed in claim 1 wherein said woven fabric strip further has a second lateral fringe along and extending beyond said second lateral edge, said second lateral fringe also being ends of said crosswise yarns.

4. The method as claimed in claim 3 wherein said step of manufacturing a woven fabric strip comprises the step of removing at least one lengthwise yarn from an edge thereof to provide said second lateral fringe along said second lateral edge.

5. The method as claimed in claim 1 wherein said woven fabric strip is of a single-layer weave.

6. The method as claimed in claim 1 wherein said woven fabric strip is of a multi-layer weave.

7. The method as claimed in claim 1 wherein said lengthwise and said crosswise yarns are of a synthetic polymeric resin.

8. The method as claimed in claim 1 wherein the step of spirally winding said fabric strip is performed by spirally winding said fabric strip about at least two parallel rolls.

9. The method as claimed in claim 1 further comprising the step of heat-setting said woven fabric strip following the step of manufacturing said fabric strip.

10. The method as claimed in claim 1 further comprising the step of trimming said papermaker's fabric to provide said papermaker's fabric with lateral edges parallel to each other and to a machine direction thereof, and defining a width of said fabric.

11. The method as claimed in claim 1 wherein said anvil is a circumferential surface of a rotatable cylindrical member.

12. The method as claimed in claim 11 wherein said circumferential surface is knurled.

13. A papermaker's fabric comprising a fabric strip woven from lengthwise yarns and crosswise yarns, said fabric strip having a first lateral edge and a second lateral edge separated by a woven fabric strip body, said first lateral edge having a first lateral fringe, formed by ends of said crosswise yarns extending beyond said first lateral edge, said fabric strip being spirally wound in a plurality of contiguous turns wherein said first lateral edge in a turn of said fabric strip body abuts said second lateral edge of an adjacent turn thereof, thereby forming a spirally continuous seam separating adjacent turns of said fabric strip, said spirally continuous seam being closed by ultrasonically bonding said first lateral fringe to said fabric strip along said second lateral edge in an adjacent turn thereof, thereby providing an endless papermaker's fabric having a machine direction, a cross-machine direction, an inner surface and an outer surface.

14. A papermaker's fabric as claimed in claim 13 wherein said second lateral edge of said fabric strip has a second lateral fringe formed by ends of said crosswise yarns extending beyond said second lateral edge, and wherein said second lateral fringe is ultrasonically bonded to said fabric strip along said first lateral edge in an adjacent turn thereof.

15. A papermaker's fabric as claimed in claim 13 wherein said fabric strip is of a single-layer weave.

16. A papermaker's fabric as claimed in claim wherein said fabric strip is of a multi-layer weave.

17. A papermaker's fabric as claimed in claim 13 wherein said lengthwise yarns and said crosswise yarns are of a synthetic polymeric resin.

18. A papermaker's fabric as claimed in claim 13 having lateral edges trimmed in a direction parallel to said machine direction thereof.

19. A papermaker's fabric as claimed in claim 13 wherein said papermaker's fabric is a component of a forming fabric.

20. A papermaker's fabric as claimed in claim 13 wherein said papermaker's fabric is a component of a press fabric.

21. A papermaker's fabric as claimed in claim 20 further comprising a non-woven batt of staple fiber material needled into at least one of said inner and outer surfaces thereof.

22. A papermaker's fabric as claimed in claim 13 wherein said papermaker's fabric is a component of a dryer fabric.

23. A papermaker's fabric as claimed in claim 13 wherein said papermaker's fabric is a component of a base for a polymeric-resin-coated paper industry process belt.

24. A papermaker's fabric as claimed in claim 13 wherein said lengthwise yarns of said fabric strip make an angle of less than 10° with respect to a machine direction of said papermaker's fabric.

* * * * *